RECORDING AND/OR PLAY-BACK APPARATUS EMPLOYING
A RECORD CARRIER IN TAPE FORM
Filed July 11, 1966

INVENTOR.
FRIEDRICH LAA
BY
AGENT 3,439,919

RECORDING AND/OR PLAY-BACK APPARATUS EMPLOYING A RECORD CARRIER IN TAPE FORM

Friedrich Laa, Vienna, Austria, assignor, by mesne assignments, to U.S. Philips Corporation, New York, N.Y., a corporation of Delaware Filed July 11, 1966, Ser. No. 564,124
Claims priority, application Austria, Aug. 25, 1965, A 7,812/65
Int. Cl. G11b 5/00
U.S. Cl. 274—4 3 Claims

ABSTRACT OF THE DISCLOSURE

A tape cartridge illuminating and tape recorder condition indicating device which uses a light placed beneath the transparent lower cover of a recording tape cartridge to illuminate the tape reels within the cartridge and to indicate whether the recorder has been energized and whether the tape cartridge has been correctly inserted into the recorder.

The invention relates to a recording and/or playback apparatus employing a record carrier in tape form which is reeled on at least one roll in a cartridge in the bottom and cover surfaces of which transparent parts, for example, apertures, are provided for observing the roll or rolls of tape.

According to the invention in such an apparatus at least one signalling lamp which serves for indicating the readiness for use and/or an operating condition is provided in the apparatus below the transparent parts of the bottom and the cover surfaces of the cartridge.

As regards the operation said measure has the advantage that with the indication of the readiness for use and/or an operating condition also the transparent parts of the cartridge through which a roll of tape can be observed are illuminated so that the circumference of the roll of tape is sharply outlined. As a result of this it becomes considerably easier, for example, during recording, to establish how much of the record carrier was already used. Often, a scale is provided near the transparent parts which enables the quantitative determination of the quantity of record carrier used. By the measure according to the invention the reading of the scale is considerably facilitated.

In order that the invention may readily be carried into effect, it will now be described in greater detail, by way of example, with reference to the accompanying drawings, in which.

Figure 1:
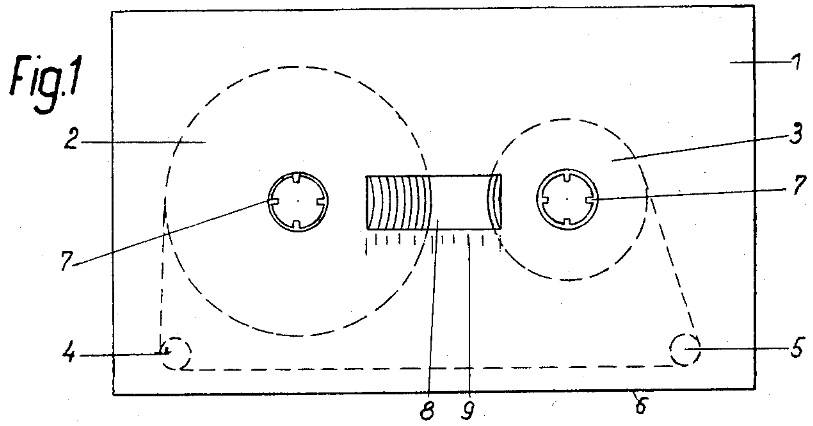
FIG. 1 is the plan view of a known cartridge with transparent parts in bottom and cover surfaces, for indicating the reeled tape.

The cartridge 1 shown in FIG. 1 comprises two rolls of tape 2 and 3. The tape (record carrier) is guided through guides 4, 5 and along the side 6 of the cartridge from one roll to the other. When the cartridge is placed on the apparatus scanning elements contact the tape within the area between the guides 4 and 5. For moving the tape one of the rolls is driven, as is normal, and the holes in the cores on which the rolls are reeled are provided with teeth 7, which are made accessible through the bottom and cover surfaces of the cartridge. In the bottom and in the cover surfaces of the cartridge apertures 8 are provided which are closed with a transparent synthetic material so that parts of the rolls of tape can be observed. Along an edge of the aperture 8, which extends from one roll to the other a scale 9 is provided which enables the quantitative determination of the quantity of the tape on one or on the other roll. Since in the present cartridge both the roll 2 and the roll 3 may serve as a supply roll, the apertures 8 are provided in such manner that parts of the two rolls of tape can be observed.

Figure 2:
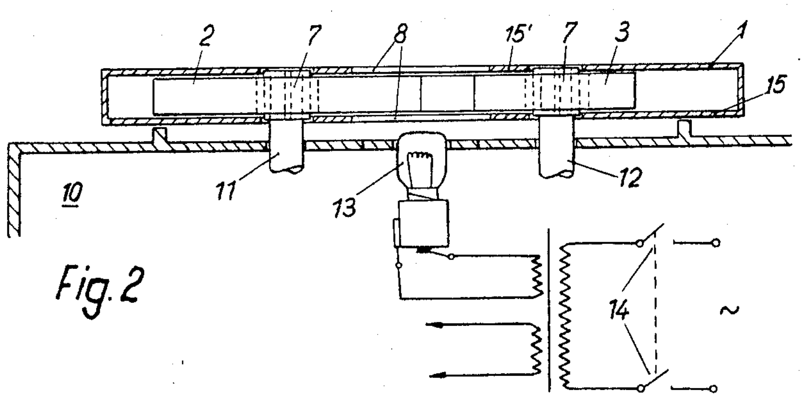
FIG. 2 shows partly diagrammatically a cartridge according to FIG. 1 which is placed on an apparatus constructed according to the invention.

FIG. 2 shows a recording and/or play-back apparatus 10 on which a cartridge 1 shown in FIG. 1 is placed.

For driving the rolls spindles 11 and 12 extend in the cartridge and engage the teeth 7. The elements serving for scanning tape and further details which are unimportant for the invention are not shown.

According to the invention the apparatus 10 comprises a signalling lamp 13 which in known manner indicates the readiness for use of the apparatus, for example, in that in closing the main switch 14, voltage is set up at the signalling lamp below the transparent part 8 of the bottom and cover surfaces 15 and 15′ respectively of the cartridge. So the lamp illuminates the bottom surface 15 of the cartridge and the light falls through the transparent parts 8 insofar as they are not screened by the roll of tape. For an operator, who observes the apparatus from above, the circumference of the reeled tape is sharply outlined against the illuminated parts of the aperture 8 so that he can easily see how the tape is distributed between the two rolls.

The light falling between the rolls through the apertures 8 also indicates that the apparatus is ready for use.

Figure 3:
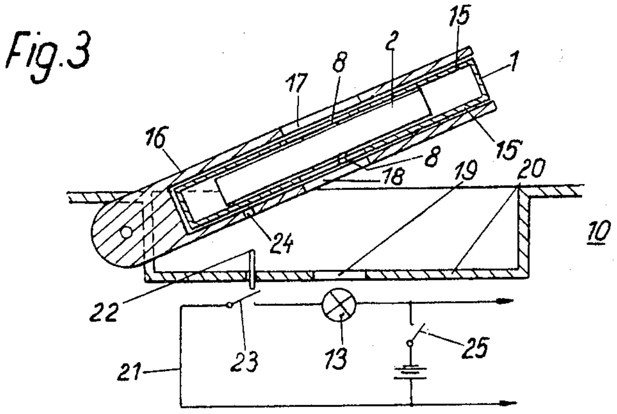
FIG. 3 is an embodiment in which the apparatus is provided with a device for connecting a cartridge to the apparatus.

To facilitate laying a cartridge in the apparatus, the apparatus 10 shown in FIG. 3 is provided with a hinged cover 16 in which the cartridge is first placed and then, by closing the cover, is connected to the apparatus. To avoid drawing complexity the driving spindles for the rolls projecting from the apparatus are not shown. In places corresponding with the position of the transparent parts 8 in the bottom and cover surfaces 15 and 15′ respectively of the cartridge, apertures 17 and 18 are provided in the hinged cover 16. Below a corresponding aperture 19 in the cover plate 20 of the apparatus a signalling lamp 13 is provided. In the current circuit 21 of the lamp a switch 23 controlled by a sensing pin 22 is provided. When the cover is lowered said sensing pin projects through an aperture 24 in the cover in the space where the cartridge is located. The current circuit 21 of the lamp is closed through a battery for supplying the apparatus and a main switch 25.

In this manner it is reached that the signalling lamp 13 is on only when the main switch 25 is closed and a cartridge is connected to the apparatus and the apparatus is actually ready for use. The readiness for use is signalled by the light falling through the apertures 19, 18, 8 and 17, it being also clearly outlined how the tape is distributed between the two rolls.

It has further proved to be useful to indicate the operating condition "recording" by a separate lamp provided in the apparatus below the transparent part in the cartridge, since it is important, particularly when recording, to know the quantity of tape which is available.

Variations of the proposed measures are possible without leaving the scope of the invention. For example, the operating conditions "recording" and "play-back" can be indicated by separate lamps having different light colours below the transparent parts of the cartridge. Such lamps may also be combined with a lamp, which only indicates the readiness for use. Of course, for indicating the readiness for use, it is alternatively possible to provide two lamps, one according to the invention in the apparatus below the transparent parts of the cartridge, the other in normal manner at another place of the apparatus, for example, on the cover plate. The invention is not restricted to cartridge constructions as shown in FIG. 1. For applying the measures according to the invention it is only necessary that the bottom and cover surfaces of the cartridge comprise transparent parts through which the tape reeled on at least one roll can be observed.

What is claimed is:

1. Tape recording/playback apparatus comprising a tape cartridge having upper and lower cover surfaces spaced apart, a tape roll within said cartridge having the axis thereof extending through said cover surfaces and extending into the space between said cover surfaces, said cover surfaces comprising aligned transparent areas exposing said tape roll to view, a support member for said tape cartridge, said support member comprising a transparent portion in optical alignment with said transparent areas of said cover surfaces, a lamp arranged in fixed position relative to the transparent portion of said support member and adapted to illuminate said tape roll through said transparent areas of said cover surfaces, and means to energize said lamp thereby to indicate an operating condition of said tape apparatus and the amount of tape on said roll confronting a given portion of the transparent areas of said cover surfaces.

2. Apparatus as claimed in claim 1, further comprising an electric power source, a switch connected in series with said source, said source and said switch comprising a power circuit, and means for connecting said lamp across said power circuit in response to insertion of said cartridge in said recorder.

3. Tape recording/playback apparatus comprising a tape cartridge having upper and lower cover surfaces spaced apart, a tape roll within said cartridge having the axis thereof extending into the space between said cover surfaces, said cover surfaces comprising aligned transparent areas exposing said tape roll to view, a support member for said tape cartridge, said support member comprising a sleeve for receiving a cartridge, said sleeve having transparent areas aligned with said transparent areas in said received cartridge, a base member, means for pivotally mounting said sleeve to said base member so as to be rotatable to an operable position parallel said base member, a hole in said base member for receiving said lamp in aligned relationship with said transparent areas in said sleeve and said cartridge, a power supply, and switch means connected in series between said lamp and said supply and projecting from said base toward said sleeve for connecting said power source to said lamp in response to said operable position of said sleeve.

References Cited

UNITED STATES PATENTS 2,788,437 4/1957 Howle ............. 240—2.12

FOREIGN PATENTS 1,128,165 1962 Germany.

ROBERT B. HULL, *Primary Examiner.*

ROGER A. FIELDS, *Assistant Examiner.*